United States Patent
Bujny et al.

(10) Patent No.: US 12,124,995 B2
(45) Date of Patent: Oct. 22, 2024

(54) METHOD FOR STRUCTURAL OPTIMIZATION OF A DESIGN AND COST OF A PHYSICAL OBJECT

(71) Applicants: Honda Research Institute Europe GmbH, Offenbach/Main (DE); Honda Motor Co., Ltd., Tokyo (JP)

(72) Inventors: Mariusz Bujny, Offenbach (DE); Hung Lin, Offenbach (DE); Nathan Zurbrugg, West Liberty, OH (US); Duane Detwiler, Marysville, OH (US); Stefan Menzel, Offenbach (DE)

(73) Assignees: Honda Research Institute Europe GmbH, Offenbach/Main (DE); Honda Motor Co., Ltd., Tokyo (JP)

( * ) Notice: Subject to any disclaimer, the term of this patent is extended or adjusted under 35 U.S.C. 154(b) by 2 days.

(21) Appl. No.: 17/557,052

(22) Filed: Dec. 21, 2021

(65) Prior Publication Data
US 2023/0196290 A1 Jun. 22, 2023

(51) Int. Cl.
  *G06Q 10/06* (2023.01)
  *G06Q 10/0631* (2023.01)
  *G06Q 10/101* (2023.01)

(52) U.S. Cl.
  CPC ..... *G06Q 10/101* (2013.01); *G06Q 10/06313* (2013.01)

(58) Field of Classification Search
  None
  See application file for complete search history.

(56) References Cited

U.S. PATENT DOCUMENTS

| 10,853,528 B2 | 12/2020 | Olhofer et al. |
| 2014/0214370 A1* | 7/2014 | Olhofer ............... G06F 30/23 703/1 |

(Continued)

OTHER PUBLICATIONS

Pehrsson et al. (Leif Pehrsson, Amos H.C. Ng, David Stockton, Industrial cost modelling and multi-objective optimisation for decision support in production systems development, Computers & Industrial Engineering, vol. 66, Issue 4, 2013, pp. 1036-1048, ISSN 0360-8352).*

(Continued)

*Primary Examiner* — Matthew D Henry
(74) *Attorney, Agent, or Firm* — JCIPRNET

(57) ABSTRACT

A computer-implemented method for optimizing a design of a physical object comprises: obtaining a data representation of the design of the physical object, including a plurality of elements, determining plural element clusters comprising a plurality of elements and estimating a cost model for the physical object. The method determines derivatives of the cost model with respect to a material density of each cluster. At least one analytical derivative of a performance metric for each element is computed. The design is optimized by iteratively performing: varying the material density of at least one element based on the analytical derivative and the estimated derivatives of the cost model, estimating the cost using the cost model based on the data representation with varied material density. The method generates and outputs a signal comprising the optimized data representation in case a termination criterion has been met.

18 Claims, 8 Drawing Sheets

(56) References Cited

U.S. PATENT DOCUMENTS

2016/0078161 A1* 3/2016 Roux ............... G06F 30/23
 703/1
2022/0277330 A1* 9/2022 Styles ............ G06Q 30/0206

OTHER PUBLICATIONS

Alireza Asadpoure et al., "Incorporating fabrication cost into topology optimization of discrete structures and lattices", Struct Multidisc Optim, vol. 51, Aug. 2014, pp. 385-396.

Yuqing Zhou et al., "Gradient-based multi-component topology optimization for stamped sheet metal assemblies (MTO-S)", Structural and Multidisciplinary Optimization, vol. 58, Dec. 2017, pp. 83-94.

Jikai Liu et al., "Manufacturing cost constrained topology optimization for additive manufacturing", Frontiers of Mechanical Engineering, vol. 14, Issue 6, Mar. 2019, pp. 1-9.

J. Du et al., "Topological optimization of continuum structures with design-dependent surface loading—Part I: new computational approach for 2D problems", Structural and Multidisciplinary Optimization, vol. 27, Issue 3, Jan. 2004, pp. 151-165.

Junji Kato et al., "Analytical sensitivity in topology optimization for elastoplastic composites", Structural and Multidisciplinary Optimization, vol. 52, May 2015, pp. 507-526.

Jaewook Lee et al., "Structural Topology Optimization of Electrical Machinery to Maximize Stiffness With Body Force Distribution", IEEE Transactions on Magnetics, vol. 46, Issue 10, Oct. 2010, pp. 3790-3794.

Nam H. Kim et al., "Generalized Optimality Criteria Method for Topology Optimization", Appl. Sci., vol. 11, Issue 3175, Apr. 2021, pp. 1-14.

Mariusz Bujny et al., "Identification of optimal topologies for crashworthiness with the evolutionary level set method", International Journal of Crashworthiness, vol. 23, Issue 4, Jun. 2017, pp. 1-30.

Andres Tovar et al., "Hybrid Cellular Automata: a biologically-inspired structural optimization technique", 10th AIAA/ISSMO Multidisciplinary Analysis and Optimization Conference, Aug. 30-Sep. 1, 2004, pp. 1-15.

Muhammad Yousaf et al., "Similarity control in topology optimization under static and crash loading scenarios", Engineering Optimization, vol. 53, Issue 9, Aug. 2020, pp. 1-19.

Andr'es Tovar, "Bone Remodeling as a Hybrid Cellular Automaton Optimization Process", Doctoral Dissertation of University of Notre Dame, Dec. 2004, pp. 1-233.

Elena Raponi et al., "Kriging-Assisted Topology Optimization of Crash Structures", Honda Research Institute Europe GmbH, Jan. 2019, pp. 1-35.

Bendsoe, M. P. et al., "Topology optimization: theory, methods, and applications", Springer Science & Business Media, Dec. 2003, pp. 1-393.

Xie, Y. M. et al., "Basic evolutionary structural optimization", in Evolutionary structural optimization, Springer, Jun. 1997, pp. 12-29.

* cited by examiner

Intermediate Topology Optimization Result density ≈0          density ≈1

Interpretation as a Full Material or Void

■ Element exists
☐ Element does not exist

| Standard Topology Optimization Result | Cost-based Topology Optimization Result | Cost Change for Cost-based w.r.t. Standard Topology Optimization |
|---|---|---|
|  |  | -9% |

| | | |
|---|---|---|
|  |  | -11% |

| | | |
|---|---|---|
|  |  | -7% |

| | | |
|---|---|---|
|  |  | -8% |

METHOD FOR STRUCTURAL OPTIMIZATION OF A DESIGN AND COST OF A PHYSICAL OBJECT

FIELD OF INVENTION

The disclosure concerns the field of computer-aided engineering, and design optimization of a physical object. The invention proposes an improved computer-implemented topology optimization method for improving a design of the physical object while optimizing cost.

TECHNICAL BACKGROUND

Computer-aided engineering (CAE) supports engineers and designers in the development process for products in the form of physical objects, for example, parts of complex systems such as land vehicles, sea vehicles or air vehicles. CAE processes for physical objects include computer-implemented methods for optimizing a design of the physical object with respect to its physical properties in order to satisfy functional requirements specified for the development process. Physical properties of the design may include, for example, mass of the physical object or capability to cope with predetermined forces acting on the physical object. The development process optimizes the physical properties of the design while the design simultaneously satisfies constraints according to functional requirements.

Traditionally, this process is a manual process, for example realized in multiple steps in a V-model of the design process, which different organisations standardized. Currently, engineers use extensively Computer-Aided Design (CAD) systems and Finite Element (FE) simulations to develop a product meeting the design requirements.

More stringent environmental and safety requirements as well as stronger competition between manufacturers increase the complexity of the design process. The time available for individual design cycles decreases and a number of load cases for the product and simulation disciplines required during the design process rises considerably. Numerical optimization methods become essential in supporting the design process, which previously relied on intuition and experience of the design engineer. Especially early phases of the design process use topology optimization methods having a high degree of design freedom to inspire new design concepts.

Topology optimization starts with the definition of a design space based on the exterior and interior geometric limitations of the physical object. Defining load cases, which are simulated using FE solvers for each design concept proposed by the topology optimization algorithm, follows. Currently, the design engineer interprets a final design resulting from topology optimization manually, since the complexity of the obtained structure of the final design of the product often prohibits a direct and immediate physical realization using a conventional manufacturing process. Thus, frequently the manually interpreted design does not meet all structural requirements and a shape optimization step as well as a sizing optimization step often follow to the topology optimization in order to improve the interpreted design by applying relatively small geometric modifications of the interpreted design provided as a concept structure by the topology optimization.

Topology optimization methods, in particular, optimize a material distribution of the design in a predefined design space. Density-based topology optimization describes an initial design of the physical object by design representation comprising a plurality of elements in the design space. The topology optimization adjusts a normalized material density of each element in order to minimize or maximize a given objective function, for example, describing a stiffness of the design. Adjusting the material density of the elements of the design representation scales the material properties, for example Young's modulus, and thereby compliance with the requirements for the design defined in the development process.

Available topology optimization methods may provide designs of the physical object with a complex shape and structure. Topology optimization is a useful tool for the designer in early design phases of the product development process.

The available computer-implemented topology optimization methods provide resulting designs, which a designer interprets manually with respect to a structural performance and, also crucially, with respect to cost for the resulting design.

Cost associated with the resulting design may come in many different guises. Apart from manufacturing cost for the physical object, which depend largely on the design of the physical object, other cost may also influence the judgement of a particular design. The term cost may not only refer to a cost calculation according to a manufacturing cost model, but may also encompass an environmental cost model or a social cost model. The environmental cost may base on a greenhouse-gas emission model, a $CO_2$ gas emission model, a renewable resource energy model, a natural resource model, or a toxicity model. The social cost may include a model describing compliance with human right standards or with labor right standards.

A key challenge to the design process, and, in particular, to the topology optimization process is to arrive at structures for the design that may be advantageously manufactured by using available, and preferably standard technological manufacturing processes in industry. Established manufacturing processes include, for example, stamping, casting, extruding processes, and more recently, 3D printing processes.

A recent approach to improve the resulting designs provided by topology optimization includes incorporating additional manufacturing constraints into the topology optimization. However, this approach may still result in designs for the physical object, which are expensive to manufacture. Thus, multiple design steps are usually required to use effectively topology optimization methods in the development process established in industry in order to meet all the structural requirements, to provide acceptable cost while fulfilling all functional requirements to the physical object. Plural iterations and redesigns involve considerable cost and adversely affect the regularly tight time-scales of product development by extending the design phase.

Surprisingly few approaches exist, which address topology optimization with manufacturing cost as the optimization criterion. "Incorporating fabrication cost into topology optimization of discrete structures and lattices" in: *Structural and Multidisciplinary Optimization*, 51 (2), pages 385-396 by Asadpoure, A., Guest, J. K., & Valdevit, L., proposes an optimization of discrete truss structures based on a ground-structure approach, which is a particular example of topology optimization. The initial structure is fixed and the algorithm adjusts the thicknesses of the connections. The algorithm differs from standard density-based topology optimization methods, where the optimizer adjusts parameters of each element in the FE model. The objective of the algorithm is a simple analytical cost model considering material cost and fabrication cost. The material cost is proportional to a mass of the structure, while a simple formula gives the fabrication cost dependent on the dimensionless cross-sectional area without any dimensions. The algorithm computes derivatives of the cost with respect to the design variables analytically and uses the derivatives directly in a gradient-based optimization algorithm.

"Gradient-based multi-component topology optimization for stamped sheet metal assemblies (MTO-S)". in: *Structural and Multidisciplinary Optimization*, 58 (1), pages 83-94, by Zhou, Y., & Saitou, K. (2018) discloses integrating cost as a constraint in multi-component topology optimization and focusses on stamping as the manufacturing process for a product. The manufacturing cost model takes into account the geometry of the product by using continuous versions of the area of the Minimum-Area Bounding Box (MABB) and a perimeter of a product. The method computes derivatives of the objective function and constraints analytically using a symbolic computation.

Known approaches share simple analytical cost models, which allow for a direct analytical computation of the derivatives of a cost function. Every change of the cost model requires manually deriving new formulas for the derivatives of the cost function. The approaches require deriving a continuous formulation of the cost models and specifying an explicit relationship between design variables and the cost model. This excludes using commercial software or external image/geometry processing libraries, which could enable generating realistic cost models over a wide application area.

Automatically generating designs for a physical object involving low cost for the physical object while simultaneously a high compliance with functional requirements to the physical object represents a field for improving the state of the art.

SUMMARY OF THE INVENTION

A computer-implemented method for optimizing a design of a physical object using a topology optimization algorithm, according to an aspect comprises obtaining a data representation for a topology optimization of the design of the physical object. The data representation includes a plurality of elements. The method proceeds with determining plural element clusters. Each element cluster comprises a plurality of the elements. Each element belongs to one element cluster. A cost model for the physical object is estimated, and a numerical estimation to determine derivatives of the cost model with respect to a material density of each element cluster of the data representation is performed. The method computes at least one analytical derivative of a structural performance metric of the design for each element. The method proceeds with optimizing the design of the physical object using the topology optimization algorithm by iteratively performing: varying the material density of at least one of the plurality of elements of at least one element cluster based on the analytical derivative of the structural performance metric, and based on the estimated derivatives of the cost model. The method estimates the manufacturing cost using the cost model for the design based on the data representation including the plurality of elements with the varied material density. The method determines whether at least one termination criterion is met, and in case determining that the termination criterion has been met, the method generates and outputs a signal comprising the data representation of the design for which the estimated manufacturing cost are optimized.

DETAILED DESCRIPTION

Figure 1:
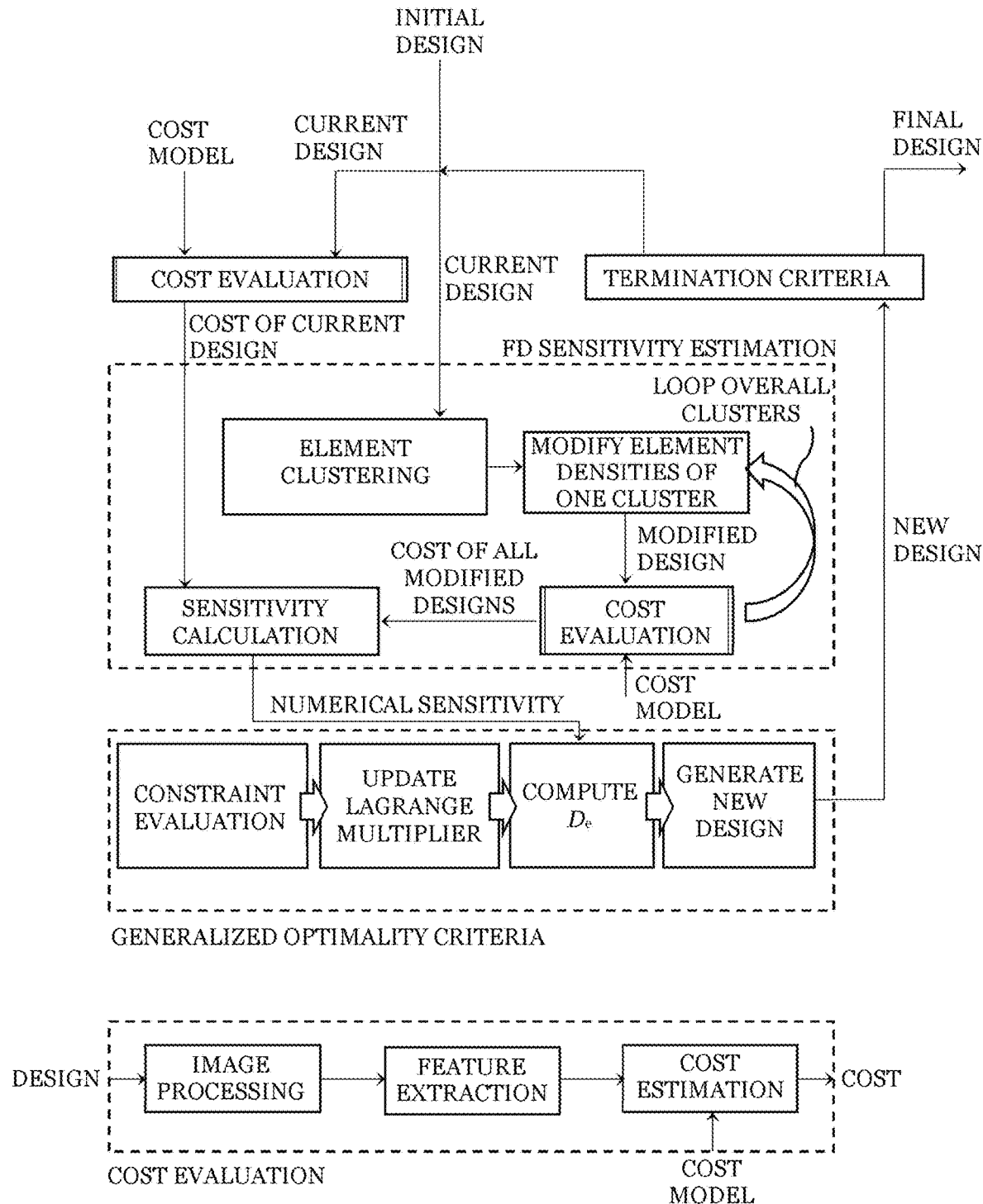
FIG. 1 represents a simplified flowchart illustrating the optimization for the cost-based topology optimization using a cluster-based finite difference method in an embodiment.

A computer-implemented method for optimizing a design of a physical object using a topology optimization algorithm, according to the aspect comprises obtaining a data representation for a topology optimization of the design of the physical object. The data representation includes a plurality of elements. The method proceeds with determining plural element clusters. Each element cluster comprises a plurality of the elements. Each element belongs to one element cluster. A cost for the physical object is estimated, and a numerical estimation to determine derivatives of the cost model with respect to a material density of each element cluster of the data representation is performed. The method computes at least one analytical derivative of a structural performance metric of the design for each element. The method proceeds with optimizing the design of the physical object using the topology optimization algorithm by iteratively performing: varying the material density of at least one of the plurality of elements of at least one element cluster based on the analytical derivative of the structural performance metric, and based on the estimated derivatives of the cost model. The method estimates the cost using the cost model for the design based on the data representation including the plurality of elements with the varied material density. The method determines whether at least one termination criterion is met. In case determining that the termination criterion has been met, the method generates and outputs a signal comprising the data representation of the design for which the estimated cost are optimized.

The method works with different types of cost. The advantages of the method become particularly evident when regarding cost as manufacturing cost. The method achieves automatically generating designs for physical objects with low cost by utilizing numerical optimization techniques. For developing affordable products, which can be manufactured in large numbers, design engineers target minimizing the total manufacturing cost of the components, while at the same time meeting the performance requirements for the product. Thus, the method provides a valuable tool for design teams in industry, for example in the automotive industry. Traditionally, executing this process is manual and implemented using multiple steps in the development process, for example based on recommendations for performing the development process based on the V-model. The V-model represents a graphical representation of a system development lifecycle and project management models for development projects. The computer-implemented method enables design engineers to utilize extensively CAD systems and FE simulations to develop a product meeting all the design requirements and minimize cost.

Currently, multiple steps are necessary in the topology-optimization-based process to obtain a design with structures that meet the performance requirements and simultaneously respect the cost limitations. The design engineer pursues a trial-and-error process, in which the design engineer modifies key parameters of the process, for example a shape of the design space, load cases and their relative importance, and optimization constraints, e.g., a total mass of the optimized design. The result of this process not necessarily suffices to obtain a feasible solution with a low cost, for example advantageously low manufacturing cost.

Contrary thereto, the proposed computer-implemented method integrates the cost model as the objective function into the topology optimization. This approach offers significant advantages over the known topology-optimization-based design process. In the particular case of the manufacturing cost, the resulting design shows a structure much closer to a design suitable for manufacturing, with significantly lower manufacturing cost.

The proposed method simplifies the topology optimization process and increases the speed of the topology optimization-based design process. This results in significant savings in terms of use of computational resources as well as hours spent by design engineers during the product design phase of the development process. Generally, the term topology optimization (TO) denotes a process of automatically providing a concept structure for the design of a mechanical structure, in present circumstances the design of the physical object. The optimization process used to improve the structure obtains responses that come from finite element analyses. The design variables correspond to parameters that describe the structure. In particular, design variables are parameters that can change directly or indirectly at least one of a dimension of the elements, grid locations and material properties of the elements. Changing the grid locations of the elements describes in particular modifying positions of nodes in a finite element mesh (grid), which forms part of shape optimization or topology optimization. Regularly, the topology optimization uses finite element methods (FEM) that are numerical methods for computationally solving partial differential equations arising from physical problems in engineering and similar application domains.

The method enables to incorporate specific know how of the design engineer into the automatic topology-optimization-based design process by employing custom cost models.

The known standard density-based topology optimization methods often provide undesired artefacts, for example designs with structures having intermediate densities not susceptible to physical realization. The method enables to integrate the cost model as an objective function into the topology optimization at an early stage of the design process and accordingly focuses the early design process already towards crucial aspects of the realization of a product. The term objective function generally denotes any of the considered responses of the physical object or structure to be optimized, which may be used as the objective function for minimization or maximization. Regularly, the objective function describes mass, stress, strain energy or frequencies.

The solution reduces cost associated with the physical object compared to a conventional Solid Isotropic Material with Penalization (SIMP) topology optimization using compliance as the objective, while simultaneously fulfilling the compliance constraint. Publication "*Topology optimization: theory, methods, and applications*" by Bendsoe, M. P., and Sigmund, O. (2003): Springer Science & Business Media provides further detail. Generally, the term constraint denotes user-specified limits. Typical constraints during optimization of physical objects are mass, stress, displacements, and dynamic displacements, velocities and accelerations.

In an industrial engineering application, the method enables targeting lowest cost while fulfilling the given requirements to the physical object.

By using and integrating a reliable cost estimation model, the solution provides a framework to generate value and even directly to reduce cost associated with the physical object.

Most significantly, the integration of the element-clustering technique boosts computation efficiency of the topology optimization process: without employing the element clustering technique, a quadratic increment with respect to the number of elements in computation cost is to be expected when regarding cost during the design optimization process. Employing the element-clustering technique results only in a linear increment with respect to the number of elements. The element-clustering technique supports avoiding the process to converge to a local minimum by enabling to detect another area in the domain of the objective function with a minimum and therefore with potentially better cost.

The method may enable to identify a lower-cost solution based on a given design.

The computer-implemented method according to an embodiment comprises determining a manufacturing process for manufacturing the physical object. The method estimates the cost model as a manufacturing cost model for the physical object based on the determined manufacturing process.

The computer-implemented method may comprise, in the step of estimating the manufacturing cost model, at least one of using a custom model for estimating the manufacturing cost of the physical object, using empirical data, using image or geometry processing libraries for estimating the manufacturing cost of the physical object, using cost estimators based on machine learning models for estimating the manufacturing cost of the physical object, and using analytical models for estimating the manufacturing cost of the physical object.

The computer-implemented method may include in the manufacturing process at least one of a stamping process, a casting process, a 3D printing process, and an extruding process.

The computer-implemented method according to an embodiment may perform the numerical estimation to determine the derivatives of the cost model with respect to the material density of each element cluster of the data representation by using direct numerical estimation based on a finite difference method for calculating the finite differences.

The computer-implemented method may perform the numerical estimation to determine the derivatives of the cost model with respect to the material density of each element cluster further comprising mapping the calculated finite differences for each element cluster to individual elements of the element cluster.

The computer-implemented method according to an embodiment is mapping the calculated finite differences for each element cluster to individual elements based on weighting an average finite difference for the element cluster with a difference of density of the individual element. Alternatively, the mapping of the calculated finite differences for each element cluster to individual elements may be performed by assigning to each element in the element cluster the same value of the calculated finite difference, resulting in a uniform sensitivity for the elements in the element cluster.

The computer-implemented method may determine the plural element clusters based on a grid-based clustering or a state-based clustering.

The computer-implemented method according to an embodiment comprises randomizing a cluster size of the element cluster by using a different grid size in each iteration.

The computer-implemented method may include varying the material density of at least one of the plurality of elements of at least one element cluster by varying the material density based on an update signal. The method may generate the update signal based on the derivatives of the cost model estimated via the cluster-based finite difference and based on the at least one analytical derivative computed using an analytical formula for a standard performance metric based on finite element simulations.

The computer-implemented method may base generating the update signal on using a predetermined gradient-based optimization method, in particular a generalized optimality criteria method. The details of the generalized optimality criteria method may be found in "Generalized Optimality Criteria Method for Topology Optimization" by Kim, N. H., Dong, T., Weinberg, D., and Dalidd, J., (2021): in *Applied Sciences* 11(7), 3175.

The computer-implemented method according to an embodiment shows the standard performance metric based on at least one of a structural performance of the physical object, in particular a stiffness parameter or a stress parameter, and a geometric property of the physical object, in particular a mass parameter or a volume parameter.

The computer-implemented method may comprise as the physical object at least one of an air vehicle, a land vehicle, a space vehicle, or an autonomous device, a building, a civil engineering device, in particular a bridge, a medical engineering device, or at least a part or component thereof.

The computer-implemented method according to an embodiment has the physical object as a structural part of a car body, in particular a car hood frame, a car door frame, a car pillar, a side sill, a bumper, a front rail, a crashbox, a floor panel, or a crossmember.

The computer-implemented method may perform the numerical estimation exclusively to determine derivatives of the cost model with respect to the material density of each element cluster individually.

Thus, the method performs the numerical estimation not for global design variables or macro design variables, such as global design parameters of the physical object.

The computer-implemented method may perform the numerical estimation to determine derivatives of the cost model with respect to the material density at least partially in parallel to estimating at least one physical performance parameter of the physical object used as criterion in the topological optimization algorithm. Alternatively or additionally, the numerical estimation of derivatives of the cost model for each element cluster may be performed in parallel, in particular on modern computer architectures including improved capabilities for parallel processing.

The computer-implemented method according to an embodiment optimizes the design of the physical object including optimizing at least one of a topology, a topometry, a topography, a shape and a size of the physical object.

The cost model of an embodiment of the computer-implemented method comprises at least one of a manufacturing cost model, an environmental cost model, a greenhouse gas emission model, a $CO_2$_ gas emission model, a renewable resource energy model, a natural resource model, a toxicity model, a social cost model, a model describing compliance with human right standards or labor right standards, and a logistic cost model.

The computer-implemented method may perform the numerical estimation to determine derivatives of the cost model with respect to a material density of each element using finite differencing or automatic differentiation.

The topology optimization algorithm of the computer-implemented method according to an embodiment is a gradient-based topology optimization algorithm, or a non-gradient based topology optimization algorithm, in particular an evolutionary level set method, a Kriging-guided level set method, or a heuristic non-gradient topology optimization algorithm, in particular an evolutionary structural optimization method or a hybrid cellular automata by integrating cost sensitivities via energy scaling method. For more details of the evolutionary level set method, reference to publications by Bujny, M., Aulig, N., Olhofer, M., & Duddeck, F. (2018): "Identification of optimal topologies for crashworthiness with the evolutionary level set method" in: International Journal of Crashworthiness, 23(4), 395-416, and Bujny, M., Olhofer, M., Aulig, N., & Duddeck, F. (2021): "Topology Optimization of 3D-printed joints under crash loads using Evolutionary Algorithms", in: Structural and Multidisciplinary Optimization, 64(6), 4181-4206 is made. For details of the Kriging-guided level set method, reference to Raponi, E., Bujny, M., Olhofer, M., Aulig, N., Boria, S., & Duddeck, F. (2019): "Kriging-assisted topology optimization of crash structures" in: Computer Methods in Applied Mechanics and Engineering, 348, 730-752 is made. For examples of the heuristic non-gradient topology optimization algorithm, in particular the evolutionary structural optimization method, reference to Xie, Y. M., & Steven, G. P. (1997): "Basic evolutionary structural optimization", in: Evolutionary structural optimization (pp. 12-29): Springer, London, is made. For the heuristic non-gradient topology optimization algorithm, in particular hybrid cellular automata, reference to Tovar A (2004) Bone remodeling as a hybrid cellular automaton optimization process. PhD Thesis, University of Notre Dame, Notre Dame, IN, USA is made. For details of integrating cost sensitivities via energy scaling, reference to Yousaf, M. S., Bujny, M., Zurbrugg, N., Detwiler, D., & Duddeck, F. (2021): "Similarity control in topology optimization under static and crash loading scenarios" in: Engineering Optimization, 53(9), 1523-1538, is made.

FIG. 1 represents a simplified flowchart illustrating an optimization in a cost-based topology optimization using cluster-based finite difference method according to an embodiment. The optimization concerns a physical object, in particular a design of the physical object. The design is available in form of a data representation or design representation, which terms are used interchangeably in the following discussion of embodiments.

The cost-based topology optimization starts with an initial design of the physical object. The initial design of the physical object is available in form of a design representation comprising a plurality of structural elements in a design space. For each element of the design representation, at least one parameter is given. The parameterization of the design in a density-based topology optimization includes a normalized material density x, $x \in [0, 1]$, of each element, which scales at least one material property of the design. The optimization algorithm adjusts the material property, for example Young's modulus, in order to minimize or maximize a given objective function. In known topology optimization algorithms, the objective function may define a stiffness of the design.

The initial design of the physical object is an input to a finite difference (FD) sensitivity derivation module. The finite difference derivation module also obtains the cost of the initial design, which corresponds to the current design when initializing the FD sensitivity derivation module, from a cost estimation module.

The cost evaluation module estimates the cost of the initial design and provides the estimated cost to the FD sensitivity derivation module. The lower part of FIG. 1 shows an embodiment of the cost evaluation. The depicted cost evaluation module is one possible example and will be discussed for the specific example of evaluating manufacturing cost based on a cost model, which is input to the cost evaluation model together with a design, whose cost the cost evaluation module determines. In particular, the cost evaluation module computes the cost based on the design representation and the cost model.

The cost evaluation module of FIG. 1 includes functional units for image processing of the design representation of the design input to the cost evaluation module. The processed design representation is provided to a feature extraction module for extracting geometric features based on the processed design representation. The cost estimation module evaluates the geometric features provided by the feature extraction module and uses the evaluated features and the cost model for determining the cost for the design input to the cost evaluation module. The cost evaluation module outputs the determined cost for the input design. The input design, in particular the design representation, for the cost evaluation module may be the initial design, a current design or a modified design.

The FD sensitivity derivation module comprises an element-clustering module. The element-clustering module obtains the current design representation of the current design. When initializing the FD sensitivity derivation module, the current design corresponds to the initial design, and the design representation of the initial design is the input to the element-clustering module. The element clustering module performs clustering of the elements of the design representation and provides the design representation with the plurality of elements arranged in a plurality of element clusters, wherein each element cluster comprises a plurality of the elements and each element belongs to one element cluster, to the element variation module. In the element variation module of the FD sensitivity derivation module, at least one element x of one cluster of the design representation is varied. Variation means in the present context, that a parameter value of the parameter x obtains a different parameter value. The parameter x is the material density of the element x. The element variation module provides the generated modified design representation to the cost evaluation module. The cost evaluation module evaluates the modified design input to the cost evaluation module based on the cost model and generates the cost of the modified design.

The element variation module of the FD sensitivity derivation module proceeds by iteratively varying at least one element x of one element cluster of the design representation for all element clusters of the design representation. The element variation module provides the generated modified design representations to the cost evaluation module. The cost evaluation module evaluates all the modified design representations input to the cost evaluation module based on the cost model and generates the cost of the modified design representations.

The cost of all modified design representations and the cost of the current design is input to the sensitivity calculation module. The sensitivity calculation module determines numerical sensitivities the cost model performing a numerical estimation by determining derivatives of the cost model with respect to the material density of each element cluster of the data representation of the current design. The FD sensitivity derivation module outputs the numerical sensitivities generated by the sensitivity calculation module and provides the generated numerical sensitivities to a generalized optimality criteria (OC) module.

The generalized OC module uses the numerical sensitivities for optimizing the design of the physical object using the topology optimization algorithm. In particular, the generalized OC module performs iteratively, until at least one termination criterion is met, a step of varying the material density of at least one of the plurality of elements of at least one element cluster based on the numerical sensitivities provided by the FD sensitivity derivation module.

The generalized OC module generates a new design based on the numerical sensitivities, based on an evaluation of the constraints of the topology optimization problem and analytical derivatives of the performance metric. The new design is output by the generalized optimality criteria module.

A termination criteria module determines whether at least one termination criterion is met. In case the at least one termination criterion is met, the new design is output as the final design. In case the at least one termination criterion is not met, the new design is the next current design. The new current design is then provided as input to the cost evaluation module for determining the cost of the (new) current design and to the element-clustering module for determining the plurality of element cluster of the (new) current in a next run of the FD sensitivity derivation module. Termination criteria may include a number of iterations of the topology optimization, or a sufficient convergence of a parameter, for example estimated cost, or structural characteristics of the design, for successive iterations.

In case the at least one termination criterion is met, an output signal is generated and output. The output signal may comprise the data representation of the final design for which the estimated costs is optimized.

The modules discussed in the overview over the cost-based topology optimization method shown in FIG. 1 are particularly suited for implementation as software running on data processing hardware including one or a plurality of processors or signal processors.

The processors or signal processors may in particular be configured to execute parallel signal processing. The processors or signal processors may form part of one or more computing devices or server devices, which further include data memory for storing program data and application data.

The computing devices or server devices may further include data input and data output interfaces, in particular for receiving data input, for example data representations for designs of physical objects, or data including the cost model(s).

The data output interface(s) may in particular output data representation for the final design of physical objects, for example to equipment and machines for manufacturing the physical object based on the data representation of the final design.

Figure 2:
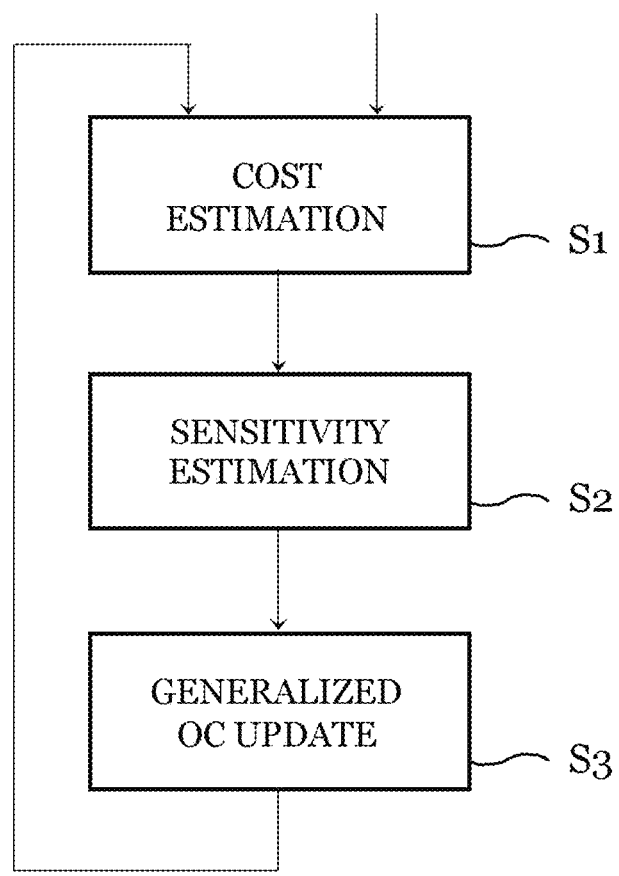
FIG. 2 illustrates the cost-based topology optimization process using numerically estimated cost derivatives and the cluster-based finite difference method according to an embodiment.

FIG. 2 illustrates the cost-based topology optimization process using numerically estimated cost derivatives and the cluster-based finite difference method according to an embodiment. The embodiment concerns optimizing a design of a physical object with respect to the manufacturing cost (cost) of the physical object.

The cost-based topology optimization method comprises three main components as illustrated in FIG. 2. Initially, step S1 defines a cost estimation model (cost model) for a predetermined manufacturing process. Due to the generic character of the proposed method, the cost-based topology optimization may use different types of cost models in the form of a black-box model. The cost model enables to estimate the manufacturing cost of a design.

Secondly, step S2 uses a cluster-based numerical method for estimating numerical derivatives of the manufacturing cost estimated in step S1 in order to determine the influence of material distribution variations on the cost, which is necessary for applying gradient-based topology optimization methods.

Finally, step S3 uses the cluster-based numerical derivatives in combination with analytical derivatives together to update the material distribution of the design. The process repeats iteratively performing steps S1, S2 and S3 until a termination criterion is met. The objective function of the optimization method, in the discussed embodiment the total manufacturing cost, is minimized, while simultaneously respecting the structural performance constraints of the optimization process. An example for the structural constraint may be a structural stiffness of the design being above the minimal limit value.

The steps S1, S2 and S3 discussed in general terms with respect to FIG. 2 will subsequently be examined in more detail.

In step S1 of defining the cost model for a predetermined manufacturing process, due to the generic character of the numerical computation of the derivatives, any black-box model for estimating manufacturing cost may be used. In present case, the term black-box denotes a model that may consist exclusively of, or include parts of a compiled computer code, e.g., commercial software, where the source code is not available. In particular, this cost model may comprise one of the examples:

cost models based on commercial software for estimating manufacturing costs, for example, software such as aPriori or LeanCOS;

cost models based on custom, confidential cost models used by individual companies, by companies over a vertical supply chain or in industrial sectors, for example the automotive sector;

cost models based on at least one of empirical data, image processing libraries, and geometry processing libraries, examples of these include OpenCV and the MATLAB Image Processing Toolbox;

cost models based on cost estimators using machine learning models; and analytical models, in particular in cases in which derivation of explicit formulas for derivatives is difficult or requires substantial work and knowledge.

Subsequently, one particular example for step S1 and a stamping manufacturing process is discussed based on estimating the manufacturing cost using a cost model, which is determined based on the MATLAB Image Processing Toolbox and on empirical data.

The cost estimation process in step S1 may comprise three individual steps: an image-processing step performed on an input design, a feature extraction step for extracting features from the input design after undergoing image processing, and the actual cost estimation step based on the extracted features from the input design.

The cost estimation process is performed on an input design, which is obtained in form of a design representation comprising a plurality of structural elements (elements). The design representation comprises for each element, a material density. The material density may be a normalized density in a range from 0 to 1. The input design may comprise a plurality of elements with intermediate material density value. An intermediate density value is a material density corresponding neither to full material nor to void (without material). An intermediate density may represent a material with intermediate material properties. An intermediate material property may, for example refer to half of the Young's modulus of steel, which is related to the stiffness of the part. Density-based topology optimization algorithms, which require continuous design variables, may use intermediate densities. The topology optimization process is expected to terminate with a final design that converges to a design comprising elements of mostly full material and void.

In the image-processing step, the input design representing an intermediate topology optimization result may be converted to a design comprising exclusively elements with full material and elements without material (void) as an input to a subsequent step applying an algorithm used for feature extraction. In a particular example, the image-processing step may evaluate a material density of each element. If the material density of the element under evaluation is below a predefined threshold value, the material density of the element under evaluation is set to void. If the material density of the element under evaluation is equal to or exceeds the predefined threshold value, the material density of the element under evaluation is set to full material. The threshold value for the normalized material density may for example be predetermined as 0.01.

Figure 3:
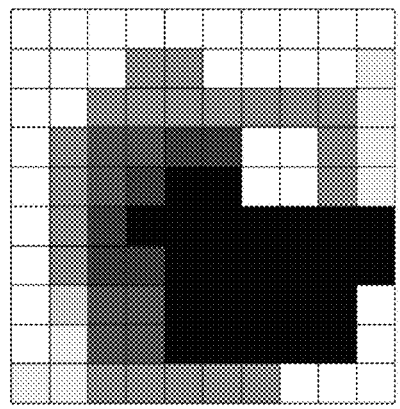
FIG. 3 illustrates a mapping from an intermediate topology optimization result to a design with a structure comprising exclusively elements with either void material or full material.
Figure 3:
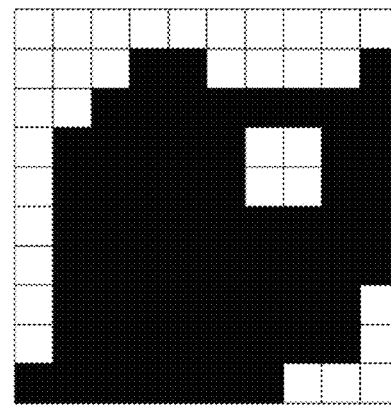

FIG. 3 illustrates a mapping from an intermediate topology optimization result to a design with a design representation composed exclusively of elements with either void material or with full material.

The left part of FIG. 3 shows a two-dimensional design representation of the input design comprising a plurality of elements with a normalized material density for each depicted element having a value between 0 and 1. The legend in the lower left part of FIG. 3 shows twelve material densities over all, including the material densities values 0 and 1, and ten intermediate material densities between and excluding the material density values 0 and 1. Performing the image-processing step on the design representation of the input design provides the result depicted in the right part of FIG. 3. After the image-processing step, the two-dimensional design representation of the design comprises a plurality of elements with a normalized material density for each depicted element having either a value of 0 or a value of 1. A value of 0 (zero) for an element of the design representation may be interpreted that the element does not exist in the design. Correspondingly, a value of 1 (integer one) for an element of the design representation may be interpreted that the element exists in the design.

After the image-processing step, the cost estimation process may proceed with the feature extraction step for extracting features from the input design after undergoing image processing.

Figure 4:
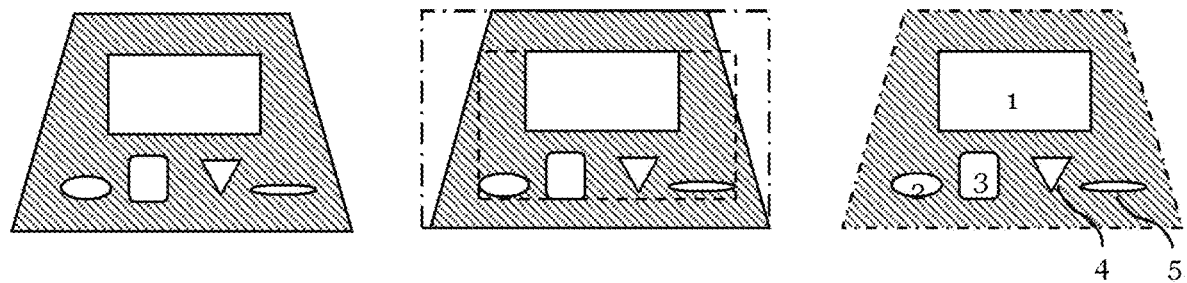
FIG. 4 illustrates features of a physical object, which the method may use for estimating cost of the physical object.

In particular, in the feature extraction step, geometric features appropriate for estimating the stamping cost may be automatically extracted using image processing libraries. FIG. 4 illustrates an example for the feature extraction step for the manufacturing process involving stamping. FIG. 4 illustrates geometric features of a design of the physical object, which the method may subsequently use for estimating cost of the physical object.

The left part of FIG. 4 depicts the design representation of the physical object. The physical object shown is a two-dimensional object, with a trapezoidal outer shape including five holes arranged in the object. The holes each have an individual size and shape. The left part of FIG. 4 depicts a first geometric feature, which corresponds to an actual area of the design representation (hatched area). The center part of FIG. 4 shows in addition to the first geometric feature a further group of geometric features of the design representation. The geometric features of the design representation in the centre part of FIG. 4 include:

the Minimum-Area Bounding Box (MABB) area of the design representation (dot-dashed line), and
the MABB area of the holes inside the design representation (dashed line).

The right part of FIG. 4 shows in addition to the first geometric feature and the further group of geometric features of the design representation a yet a further group of geometric features, which include the perimeter of the design representation (double-dot-dashed line),
the sum of perimeters of all the holes in the design representation (overall length of the un-interrupted lines enclosing the holes 1 to 5), and
the individual identifier of each hole in the design representation. The identifiers for the holes in FIG. 4 are integer numbers ranging from 1 to 5 for a total of five holes in the example.

The extracted features provided by the feature extraction step are the input to the subsequent cost estimation step based on the extracted features of the input design representation. The cost estimation step estimates the total cost of the physical object based on the design representation based on the extracted features. The total cost of the physical object may be estimated by summing up individual cost components. In the particular example of manufacturing cost, the cost components may include energy cost, in particular electricity cost,
die machining cost,
material cost, and
die-set cost.

Figure 5:
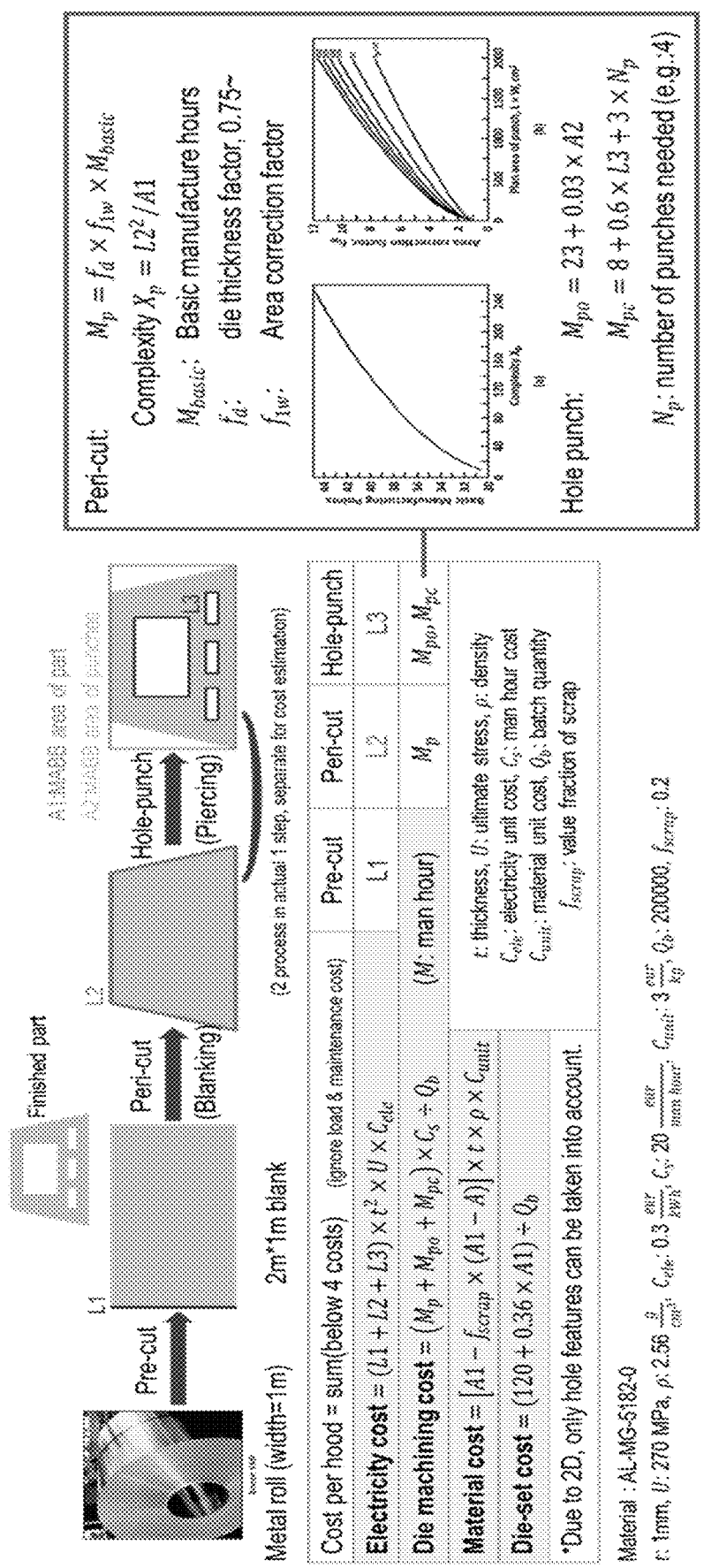
FIG. 5 depicts an example for determining manufacturing cost of the physical object.

FIG. 5 illustrates an example for determining manufacturing cost of the physical object in the cost estimation step based on the extracted geometric features. The exemplary physical object is a two-dimensional object, with a trapezoidal outer shape including four holes arranged in the physical object. The physical object is manufactured from raw material provided in form of metal roll and involving cutting and hole-punching processes. The presented example for estimating the manufacturing cost of the specific manufacturing process for the physical object bases on a publication by Boothroyd, G., Dewhurst, P., & Knight, W. A.: Product design for manufacture and assembly, CRC press, ISBN: 0-8247-0584-X, $2^{nd}$ ed., 2010, which provides a basis for potential approaches for implementing the step of estimating the manufacturing cost for the design of the physical object.

Figure 6:
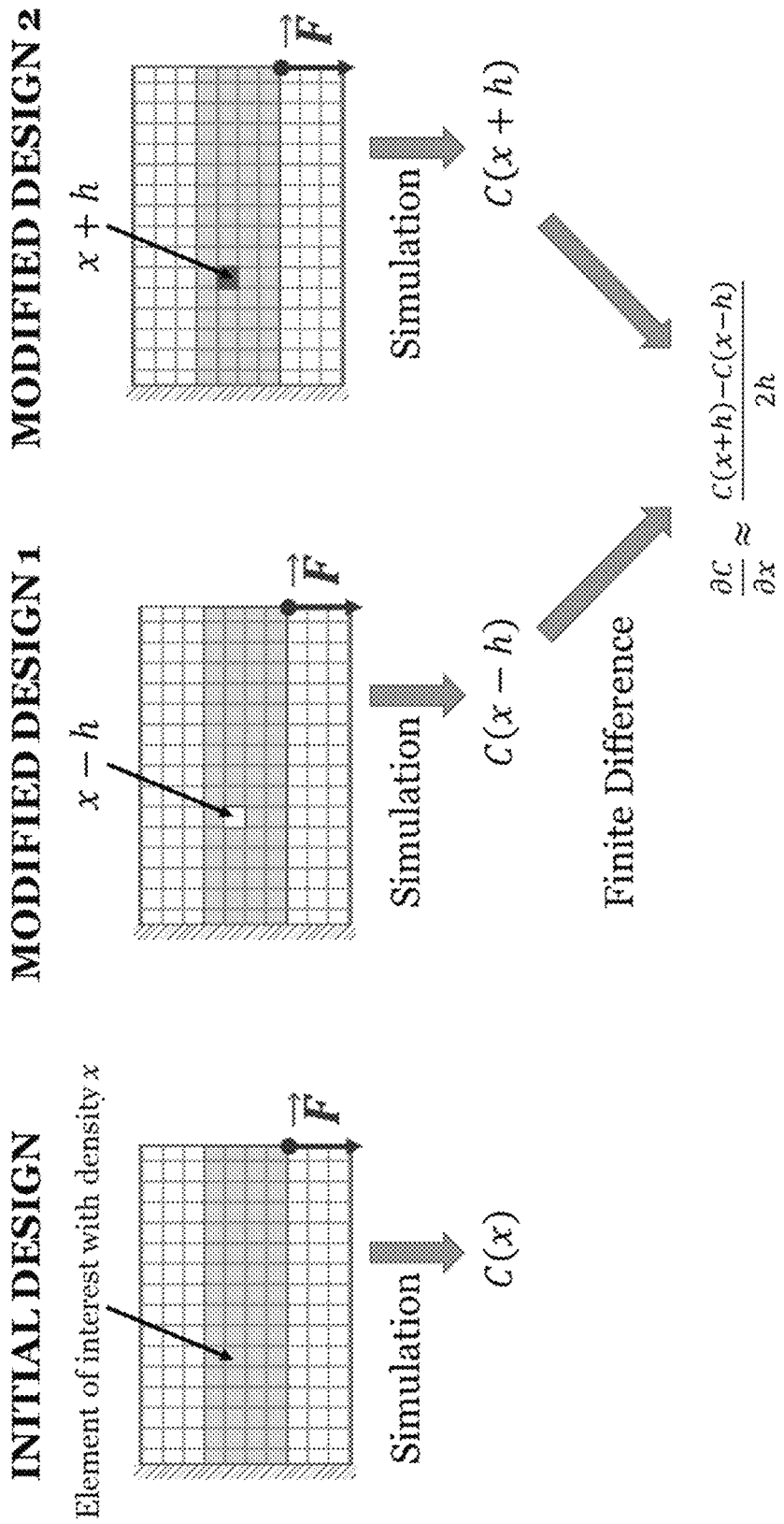
FIG. 6 illustrates the application of a central finite difference scheme in topology optimization for estimating a sensitivity of the objective function with respect to a material density of a single element of a design representation.

FIG. 6 illustrates the application of a central finite difference scheme in topology optimization for estimating a sensitivity of the objective function with respect to a material density of a single element of the design representation. FIG. 6 illustrates an implementation useful for step S2. S2 uses a cluster-based numerical method for estimating numerical derivatives of the manufacturing cost estimated in step S1 in order to determine the influence of material distribution variations on the cost. Nevertheless, S2 performs the numerical estimation of derivatives of the cost model based on the cluster-based finite difference method.

In order to estimate the derivatives of the cost model with respect to the material densities, the cost-based topology optimization method uses a numerical estimation of the derivatives based on the finite difference (FD) method. In particular, the cost-based topology optimization method uses a cluster-based finite difference method.

Generally, for performing a gradient-based topology optimization, partial derivatives of the objective function of the topology optimization with respect to the material density of each element are required. FIG. 6 illustrates an example for the central finite difference scheme in topology optimization for estimating the sensitivity of the objective function with respect to a material density of a single element of the design representation for illustration purpose.

FIG. 6 shows computing the partial derivative of the objective function with respect to the material density of each element of the design representation. The left part of FIG. 6 shows an initial design representation in the design space. The design representation includes a particular element (element of interest) with a material density x for which the partial derivative is to be computed. The method estimates the objective function $C(x)$ based on the determined cost model. In particular, the cost $C(x)$ of the design for the element of interest having the density x is determined using a simulation.

In the center part of FIG. 6, the design representation is modified by amending the value of the material density of the element of interest from x to $(x-h)$. Via simulation, the method estimates the objective function $C(x-h)$ based on the determined cost model. In particular, the cost $C(x-h)$ of the design for the element of interest having the density x-h is determined.

In the right part of FIG. 6, the design representation is modified by amending the value of the material density of the element of interest from x to $(x+h)$. Via simulation, the method estimates the objective function $C(x+-h)$ based on the determined cost model. In particular, the cost $C(x+h)$ of the design for the element of interest having the density x+h is determined.

The partial derivative of the objective function with respect to the material density of the element of interest is now estimated by $$\frac{\partial C}{\partial x} \approx \frac{C(x+h) - C(x-h)}{2h}.$$

To estimate the full gradient of the objective function, the process depicted in FIG. 6 is repeated for each element of the design representation of the current design of the physical object.

The FD method is generally known, although the known uses up to now include validating derivation of analytical sensitivities or computing semi-analytical sensitivities only. Contrary to the known approaches, the cost-based topology optimization uses the cluster-based FD method in order to compute directly a gradient of the objective function in topology optimization. The high computational cost of the FD approach results in using it for costly objective functions, computed using FE simulations, practically infeasible. However, in case of image-processing-based cost models, which are relatively cheap to compute in comparison to FE simulations, it proved feasible to employ FD also for solving large-scale problems. This is in particular possible due to improving the efficiency of the known FD approach by using element clustering according to the embodiment of the cost-based topology optimization method. The element clustering used in the cost-based topology optimization according to the embodiment, which varies material densities of multiple elements included in one cluster at once decreases computational costs efficiently.

A further advantage of the element clustering of the cost-based topology optimization according to the embodiment is that the cost estimation for multiple modified designs of the physical object can be performed in parallel on computer architectures.

In particular, element clustering can be performed in different forms:

Grid-based clustering is based exclusively on a location of elements in the design space. In particular, a group of neighbouring elements may form an element cluster (cluster). For example, four elements arranged as a square in a two-dimensional design space may form a cluster.

Alternatively, in state-based clustering, generating a cluster of elements bases on a state of the elements. For example, a cluster may include elements of the design representation, which have a similar material density. In particular, a cluster may include those elements of the design representation, which have values for the material density within a pre-defined range of values.

Figure 7:
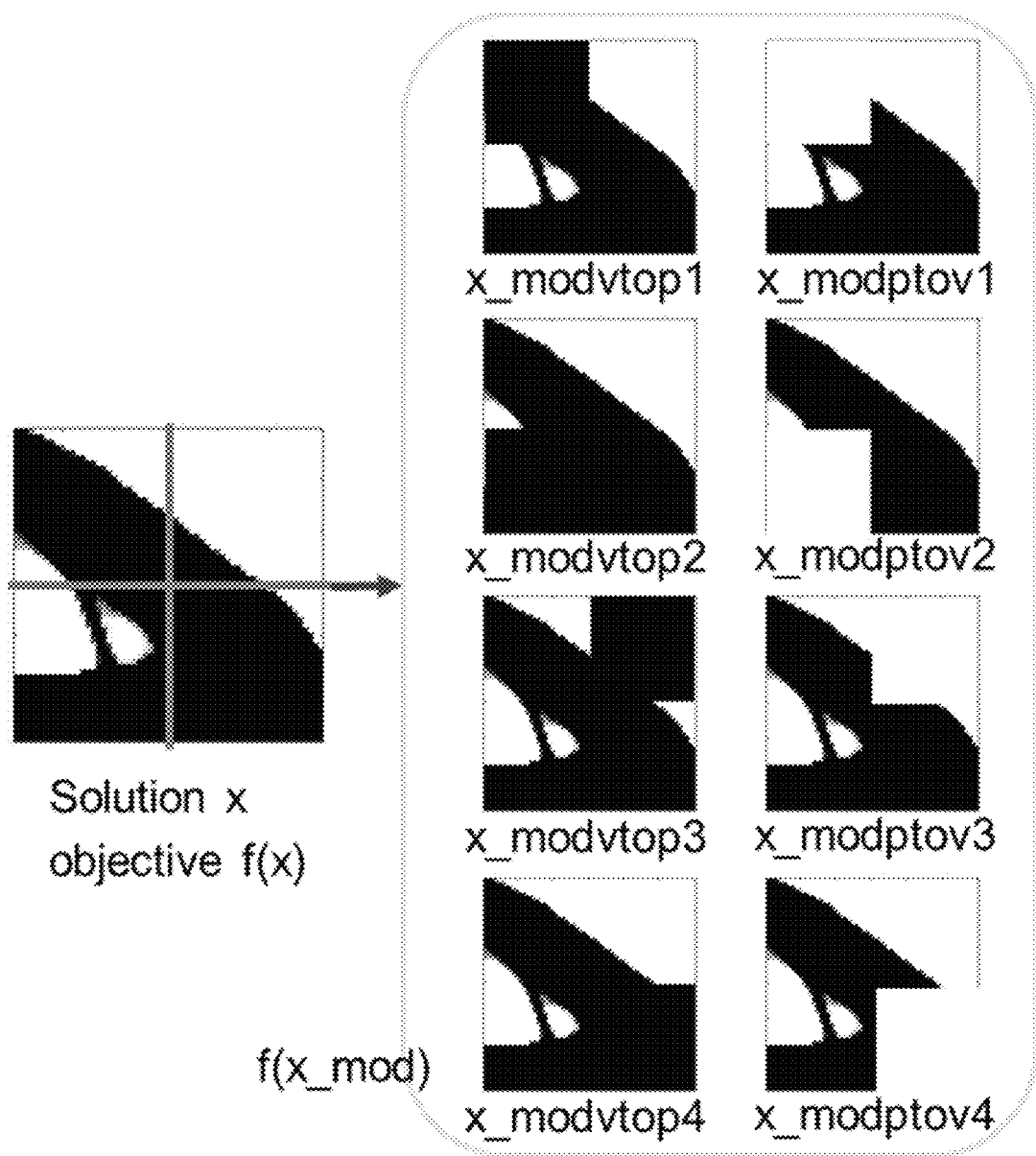
FIG. 7 illustrates an example of a grid-cluster-based finite differencing scheme using four clusters.

FIG. 7 illustrates an example of a grid-based cluster used in the finite differencing scheme using four clusters. The left portion of FIG. 7 shows a design representation x representing a solution for the design of the physical object. The elements of the design representation are clustered into four clusters. The objective function of the topology optimization is f(x). The right portion of FIG. 7 illustrates the possible variations of the design representation for the cluster-based finite differencing by either removing or adding material to each of the four cluster. Thereby, the design variations with objective functions f(x_mod) in FIG. 7 are:
f(x_modvtop1), f(x_modptov1), f(x_modvtop2), f(x_modptov2), f(x_modvtop3), f(x_modptov3), f(x_modvtop4), f(x_modptov4).

The method performs a cost estimation for each variation of the design representation by either removing or adding material in the respective cluster. In FIG. 7, the design representation is varied by either removing or adding material in each selected cluster instead of varying the material density in each element separately and individually.

The cost-based topology optimization method integrates numerical sensitivities and analytical sensitivities. The cost-based topology optimization method uses numerical sensitivities of cost estimated via cluster-based finite difference method and the analytical sensitivities computed using analytical formulas for standard performance metrics based on FE simulations together to generate the density update signals during the topology optimization. This combination differs from the known approaches in topology optimization. The known approaches in topology optimization avoid combining numerical sensitivities and analytical sensitivities due to excessive computational costs of the finite difference method. The cost-based topology optimization method generates update signals using standard gradient-based optimization methods. The standard gradient-based optimization methods may include, for example, the generalized optimality criteria method.

The finite difference calculated for an entire cluster is mapped to individual elements of the cluster, as the derivatives for the structural performance criteria of the topology optimization are calculated on the level of individual elements. There exist plural possibilities for mapping the finite differences possibilities to individual elements.

In a particular embodiment of the cost-based topology optimization method applies a weighting to the finite difference for the element cluster, wherein the weight is based on a difference of a material density of a particular element. In particular, weighting may be performed by $$D_1 = \frac{f(x_{1mod}, x_{2mod}, x_{3mod}, \ldots, x_{N_e mod}) - f(x_1, x_2, x_3, \ldots, x_{N_e})}{N_e}, \text{ and}$$

$$f_x = \frac{D_1}{x_{mod} - x}.$$

where $x_1, x_2, x_3, \ldots, x_{N_e}$ are element densities before modification according to the cluster-based FD step, $x_{1mod}, x_{2mod}, x_{3mod}, \ldots, x_{N_e mod}$ are the element densities after performing a density variation according to the FD step, and $N_e$ is the number of elements within a cluster. The derivative of the objective function with respect to the density of the i-th element ($x_i$) is denoted by $f_{x_i}$.

Alternatively, the computation of derivatives on the element level based on the cluster-based FD can be done as follows:

$$D_2 = \frac{f(x_{1mod}, x_{2mod}, x_{3mod}, \ldots, x_{N_e mod}) - f(x_1, x_2, x_3, \ldots, x_{N_e})}{(x_{1mod} - x_1) + (x_{2mod} - x_2) + \ldots + (x_{N_e mod} - x_{N_e})}, \text{ and}$$

$$f_{x_i} = D_2,$$

which corresponds to an uniform mapping of the finite differences computed on the cluster level to the individual elements of the element cluster.

Additionally, the method may include an optional step of randomizing cluster sizes of the element cluster by using different grid sizes for the cluster in each iteration.

For the cost objective, a large step size (density variations) may be considered when compared to the standard finite-differencing in order to delete or create material, which is necessary to obtain different cost estimates for the modified designs representations.

Figure 8:
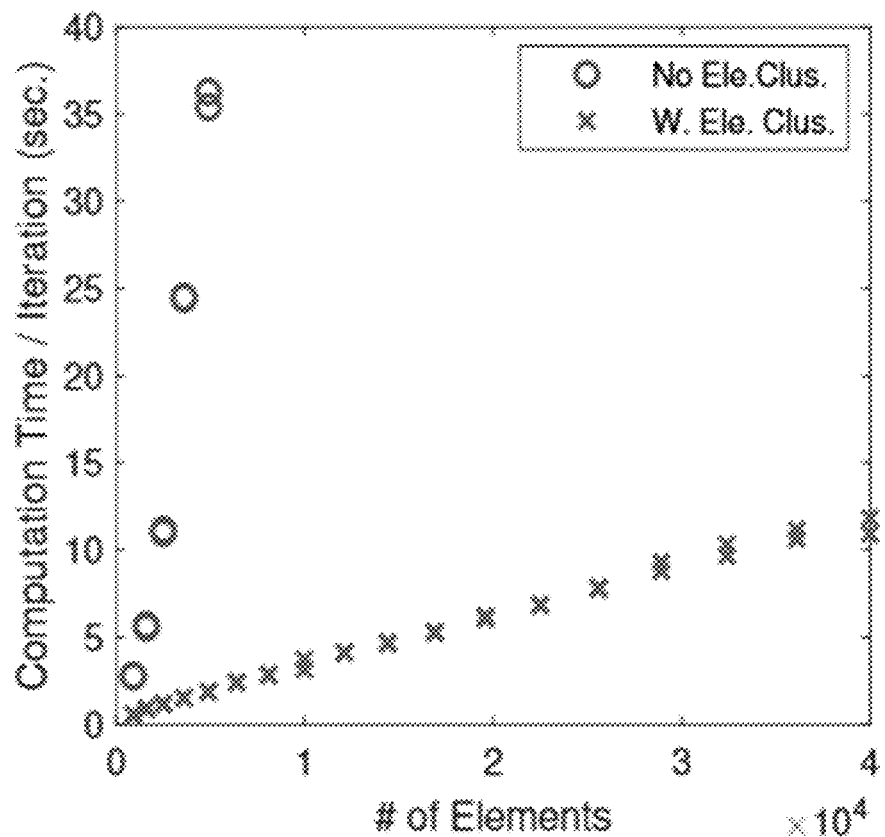
FIG. 8 shows the advantageous effects of the element-clustering scheme for a single iteration with and without element clustering for a different number of elements.

FIG. 8 shows the advantageous effects of the element-clustering scheme for a single iteration with and without element clustering for a different number of elements.

The cluster-based finite difference method significantly increases the speed of numerical sensitivity estimation. The cluster-based finite difference method is particularly suited for real-world applications in the development process for physical objects. FIG. 8 shows a computation time per iteration in seconds shown on the ordinate axis and the number of elements of the design representation on the abscissa axis. FIG. 8 denotes the curve for a single optimization iteration for the known approach without applying element clustering denoted by circles. The curve depicts a single optimization iteration for the cluster-based finite differencing approach that is used in the method. The curves show how the computational costs scale with both the standard approach based on prior art and the cluster-based approach according to the embodiment. The final designs resulting from applying the known approach and the approach including element clustering according to the embodiment are compared in terms of manufacturing cost. The standard finite differencing approach can yield resulting designs of the physical object with a low cost, but the cluster-based finite differencing according to the embodiment can provide further improved results for the design of the physical object in terms of cost due to the ability to estimate effects on the macroscopic level.

Figure 9:
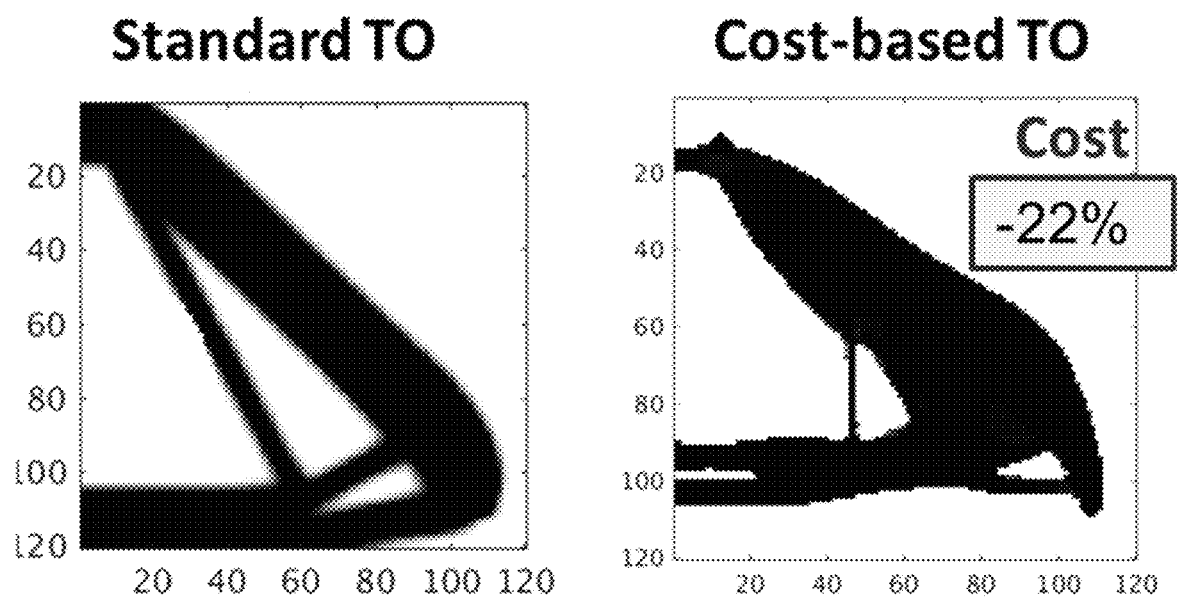
FIG. 9 illustrates the advantageous effects by comparing results of a known topology optimization with the cost-based topology optimization according to an embodiment.
Figure 10A:
FIG. 10A to 10D illustrate the advantageous effects by presenting further examples comparing a known topology optimization with the cost-based topology optimization according to an embodiment.
Figure 10A:
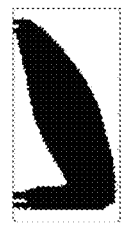
Figure 10B:
Figure 10B:
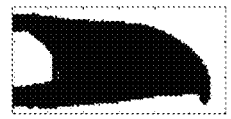
Figure 10C:
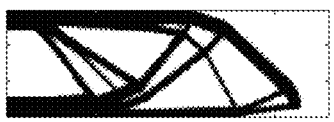
Figure 10C:
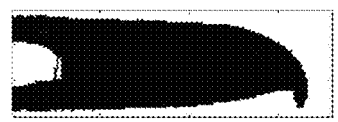
Figure 10D:
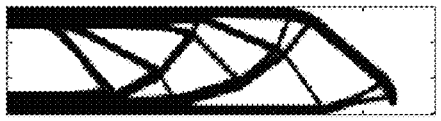
Figure 10D:
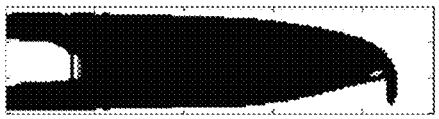

FIG. 9 illustrates the advantageous effects by comparing results of a known topology optimization with the cost-based topology optimization according to an embodiment. Both the resulting designs from the known topology optimization and from the cost-based topology optimization according to the embodiment have the same stiffness. Nevertheless, the cost for a manufacturing process using stamping for the design resulting from the cost-based topology optimization is reduced by 22% when compared with the design resulting the known topology optimization. The significant reduction in manufacturing cost associated with the cost-based topology optimization according to the embodiment is mainly due to minimizing the area of the MABB, which often represents a key determinant of the manufacturing cost.

FIG. 10A to 10D illustrate the advantageous effects by presenting further examples comparing results provided by a known topology optimization with the results provided by a cost-based topology optimization according to the embodiment. In FIGS. 10A to 10D, the designs depicted in a given figure of FIGS. 10A to 10D have approximately the same structural stiffness. In the depicted examples, the cost-based topology optimization achieves a reduction of the manufacturing cost by significantly reducing the complexity of the designs on the right hand side of FIGS. 10A to 10D when compared with the designs generated by using the known topology optimization on the left side of FIG. 10a to 10D.

What is claimed is:

1. A method of manufacturing a physical object by for optimizing a design of the physical object using a topology optimization algorithm, wherein the physical object is a structural part of a vehicle body of a land vehicle, sea vehicle, or air vehicle, the method comprising:

performing, by a computer, steps of:

obtaining, for topology optimization, a data representation of the design of the physical object, the data representation including a plurality of elements;

performing image processing on the data representation of the design of the physical object to determine plural element clusters, wherein each element cluster comprises a plurality of the elements with varied material densities;

converting the data representation of the design of the physical object to a converted design comprising elements with full material and elements without material;

performing image feature extraction on the converted design to extract geometric features of the physical object;

estimating a cost model for the physical object based on the extracted geometric features of the physical object and a manufacturing process for the physical object, wherein the manufacturing process comprises at least one of a stamping process, a casting process, a 3D printing process, a milling process, and an extruding process;

performing a numerical estimation to determine derivatives of the cost model with respect to a material density of each element cluster of the data representation;

computing at least one analytical derivative of a structural performance metric of the design, wherein the structural performance metric is based on at least one of a structural performance of the physical object, comprising a stiffness parameter or a stress parameter, and a characteristic property of the physical object, comprising a mass parameter, a geometric parameter or a volume parameter;

optimizing the design of the physical object by automatically optimizing at least one of a topology, a topometry, a topography, a shape and a size of the physical object using the topology optimization algorithm, wherein optimizing the design of the physical object uses manufacturing cost of the determined cost model directly as an objective function of the topology optimization algorithm in combination with constraints determined based on the structural performance metric, by iteratively performing:

varying the material density of at least one of the plurality of elements of at least one element cluster based on the analytical derivative of the structural performance metric, and further based on the estimated derivatives of the cost model, estimating a cost using the cost model for the design based on the data representation including the plurality of elements with the varied material density, determining whether at least one termination criterion is met;

generating and outputting, to at least one manufacturing machine, a signal comprising the data representation including the plurality of elements with the varied material density of the design for which the estimated cost is optimized in case the termination criterion has been met; and performing, by the at least one manufacturing machine, a step of:

performing the manufacturing process comprising at least one of the stamping process, the casting process, the 3D printing process, the milling process, and the extruding process for manufacturing the physical object based on the optimized design of the physical object indicated in the signal.

2. The method according to claim 1, wherein the method further comprises, by the computer,
determining the manufacturing process for manufacturing the physical object;
estimating the cost model as a manufacturing cost model for the physical object based on the determined manufacturing process.

3. The method according to claim 2, wherein
estimating the manufacturing cost model comprises, for estimating a manufacturing cost of the physical object, using at least one of a custom model, empirical data, image or geometry processing libraries, cost estimators based on machine learning models, and analytical models.

4. The method according to claim 1, wherein
performing the numerical estimation to determine the derivatives of the cost model with respect to the material density of each element cluster of the data representation uses direct numerical estimation based on a finite difference method for calculating the finite differences.

5. The method according to claim 4, wherein
performing the numerical estimation to determine the derivatives of the cost model with respect to the material density of each element cluster further comprises mapping the calculated finite differences for each element cluster to individual elements of the element cluster.

6. The method according to claim 5, wherein
mapping the calculated finite differences for each element cluster to individual elements is based on weighting an average finite difference for the cluster with a difference in density of the individual elements.

7. The method according to claim 1, wherein
determining the plural element clusters comprises grid-based clustering or state-based clustering.

8. The method according to claim 1, wherein
the method comprises randomizing a cluster size of the element cluster by using a different grid size in each iteration.

9. The method according to claim 1, wherein
varying the material density of at least one of the plurality of elements of at least one element cluster includes varying the material density based on an update signal, wherein the update signal is generated based on the derivatives of the cost model estimated via the cluster-based finite difference and on the at least one analytical derivative computed using an analytical formula for the structural performance metric based on finite element simulations.

10. The method according to claim 9, wherein
generating the update signal is based on using a predetermined gradient-based optimization method, in particular a generalized optimality criteria method.

11. The computer-implemented method according to claim 1, wherein
the physical object is a part of an autonomous device.

12. The method according to claim 1, wherein
the physical object is a structural part of a car body, in particular a car hood frame, a car door frame, a car pillar, a side sill, a bumper, a front rail, a crashbox, a floor panel, or a crossmember.

13. The method according to claim 1, wherein
the method is performing the numerical estimation exclusively to determine derivatives of the cost model with respect to the material density of each element cluster individually.

14. The method according to claim 1, wherein
the method is performing the numerical estimation to determine derivatives of the cost model with respect to the material density at least partially in parallel to estimating at least one physical performance parameter of the physical object used as criterion in the topological optimization algorithm.

15. The method according to claim 1, wherein
the cost model further comprises at least one of
an environmental cost model, a greenhouse gas emission model, a $CO_2$ gas emission model, a renewable resource energy model, a natural resource model, a toxicity model,
a social cost model, a model describing compliance with human right standards or labor right standards, and
a logistic cost model.

16. The method according to claim 1, wherein
performing the numerical estimation to determine derivatives of the cost model with respect to the material density of each element uses finite differencing or automatic differentiation.

17. The method according to claim 1, wherein
the topology optimization algorithm is
a gradient-based topology optimization algorithm, or
a non-gradient based topology optimization algorithm, in particular an evolutionary level set method, or
a heuristic non-gradient topology optimization algorithm, in particular an evolutionary structural optimization method, a hybrid cellular automata by integrating cost sensitivities via energy scaling method.

18. A method of manufacturing a physical object by optimizing a design of the physical object using a topology optimization algorithm, wherein the physical object is a structural part of a building, a civil engineering device or a medical engineering device, the method comprising:
performing, by a computer, steps of:
obtaining, for topology optimization, a data representation of the design of the physical object, the data representation including a plurality of elements;
performing image processing on the data representation of the design of the physical object to determine plural element clusters, wherein each element cluster comprises a plurality of the elements with varied material densities;
converting the data representation of the design of the physical object to a converted design comprising elements with full material and elements without material;
performing image feature extraction on the converted design to extract geometric features of the physical object;
estimating a cost model for the physical object based on the extracted geometric features of the physical object and a manufacturing process for the physical object, wherein the manufacturing process comprises at least one of a stamping process, a casting process, a 3D printing process, a milling process, and an extruding process;
performing a numerical estimation to determine derivatives of the cost model with respect to a material density of each element cluster of the data representation;

computing at least one analytical derivative of a structural performance metric of the design, the structural performance metric is based on at least one of a structural performance of the physical object, comprising a stiffness parameter or a stress parameter, and a characteristic property of the physical object, comprising a mass parameter, a geometric parameter or a volume parameter;

optimizing the design of the physical object by automatically optimizing at least one of a topology, a topometry, a topography, a shape and a size of the physical object using the topology optimization algorithm, wherein optimizing the design of the physical object uses manufacturing cost of the determined cost model directly as an objective function of the topology optimization algorithm in combination with constraints determined based on the structural performance metric, by iteratively performing:

varying the material density of at least one of the plurality of elements of at least one element cluster based on the analytical derivative of the structural performance metric, and further based on the estimated derivatives of the cost model, estimating a cost using the cost model for the design based on the data representation including the plurality of elements with the varied material density, determining whether at least one termination criterion is met;

generating and outputting, to at least one manufacturing machine, a signal comprising the data representation including the plurality of elements with the varied material density of the design for which the estimated cost is optimized in case the termination criterion has been met; and performing, by the at least one manufacturing machine, a step of:

performing the manufacturing process comprising at least one of the stamping process, the casting process, the 3D printing process, the milling process, and the extruding process for manufacturing the physical object based on the optimized design of the physical object indicated in the signal.

* * * * *